(12) United States Patent
Brahm et al.

(10) Patent No.: US 10,929,294 B2
(45) Date of Patent: Feb. 23, 2021

(54) USING CACHING TECHNIQUES TO IMPROVE GRAPH EMBEDDING PERFORMANCE

(71) Applicant: QC Ware Corp., Moffett Field, CA (US)

(72) Inventors: James W. Brahm, Colorado Springs, CO (US); David A. B. Hyde, San Carlos, CA (US); Peter McMahon, Menlo Park, CA (US)

(73) Assignee: QC Ware Corp., Palo Alto, CA (US)

( * ) Notice: Subject to any disclaimer, the term of this patent is extended or adjusted under 35 U.S.C. 154(b) by 227 days.

(21) Appl. No.: 16/041,693

(22) Filed: Jul. 20, 2018

(65) Prior Publication Data
US 2018/0349282 A1     Dec. 6, 2018

Related U.S. Application Data

(63) Continuation-in-part of application No. 15/446,973, filed on Mar. 1, 2017, now Pat. No. 10,614,370.
(Continued)

(51) Int. Cl.
*G06F 12/0842*     (2016.01)
*G06N 3/12*     (2006.01)
(Continued)

(52) U.S. Cl.
CPC ........ *G06F 12/0842* (2013.01); *G06F 9/5027* (2013.01); *G06F 16/9014* (2019.01);
(Continued)

(58) Field of Classification Search
CPC .. G06F 12/0842; G06F 17/10; G06F 16/9038; G06F 16/9014; G06F 16/9024;
(Continued)

(56) References Cited

U.S. PATENT DOCUMENTS 6,671,681 B1    12/2003    Emens et al.
6,803,599 B2    10/2004    Amin et al.
(Continued)

FOREIGN PATENT DOCUMENTS

WO    WO 2016/089711 A1    6/2016

OTHER PUBLICATIONS

PCT International Search Report and Written Opinion, PCT Application No. PCT/US17/15488, dated Apr. 20, 2017, 12 pages.
(Continued)

*Primary Examiner* — Michael A Keller
*Assistant Examiner* — Jsing Forng Lin
(74) *Attorney, Agent, or Firm* — Fenwick & West LLP

(57) ABSTRACT

In an embedding caching system, embeddings generated from previous problems are re-used to improve performance on future problems. A data structure stores problems and their corresponding embeddings. When computing future embeddings, this data structure can be queried to determine whether an embedding has already been computed for a problem with the same structure. If it has, the embedding can be retrieved from the data structure, saving the time and computational expense of generating a new embedding. In one variation, the query is not based on exact matches. If a new problem is similar in structure to previous problems, those embeddings may be used to accelerate the generating of an embedding for the new problem, even if they cannot be used directly to embed the new problem.

20 Claims, 3 Drawing Sheets

Related U.S. Application Data

(60) Provisional application No. 62/535,854, filed on Jul. 22, 2017.

(51) Int. Cl.
| | | |
|---|---|---|
| *G06F 17/16* | (2006.01) | |
| *G06F 9/50* | (2006.01) | |
| *G06N 10/00* | (2019.01) | |
| *G06F 16/901* | (2019.01) | |
| *G06F 16/9038* | (2019.01) | |
| *G06F 17/10* | (2006.01) | |
| *H04L 29/08* | (2006.01) | |

(52) U.S. Cl.
CPC ...... *G06F 16/9024* (2019.01); *G06F 16/9038* (2019.01); *G06F 17/10* (2013.01); *G06F 17/16* (2013.01); *G06N 3/126* (2013.01); *G06N 10/00* (2019.01); *H04L 67/1004* (2013.01); *H04L 67/1017* (2013.01); *H04L 67/2823* (2013.01)

(58) Field of Classification Search
CPC ....... G06F 17/16; G06F 9/5027; G06N 10/00; G06N 3/126; H04L 67/2823; H04L 67/1017; H04L 67/1004
See application file for complete search history.

(56) References Cited

U.S. PATENT DOCUMENTS

| | | | |
|---|---|---|---|
| 7,219,018 | B2 | 5/2007 | Vitaliano et al. |
| 7,877,333 | B2 | 1/2011 | Macready |
| 9,537,953 | B1 | 1/2017 | Dadashikelayeh et al. |
| 10,275,422 | B2 | 4/2019 | Israel et al. |
| 10,346,457 | B2 * | 7/2019 | Singhal ................ G06F 16/353 |
| 2002/0188578 | A1 | 12/2002 | Amin et al. |
| 2003/0105805 | A1 | 6/2003 | Jorgenson |
| 2003/0169041 | A1 | 9/2003 | Coury |
| 2008/0116449 | A1 | 5/2008 | Macready et al. |
| 2008/0260257 | A1 * | 10/2008 | Rose ...................... B82Y 10/00 382/195 |
| 2011/0022820 | A1 | 1/2011 | Bunyk et al. |
| 2013/0166353 | A1 | 6/2013 | Mihic et al. |
| 2014/0201126 | A1 * | 7/2014 | Zadeh .................. G06N 7/005 706/52 |
| 2014/0237457 | A1 | 8/2014 | Munshi et al. |
| 2014/0275807 | A1 | 9/2014 | Redei |
| 2015/0006443 | A1 | 1/2015 | Rose et al. |
| 2015/0046681 | A1 | 2/2015 | King |
| 2015/0106413 | A1 | 4/2015 | Ronagh |
| 2016/0011996 | A1 | 1/2016 | Asaad et al. |
| 2016/0224515 | A1 | 8/2016 | Ronagh et al. |
| 2017/0206276 | A1 * | 7/2017 | Gill ..................... G06F 16/9535 |
| 2017/0255629 | A1 * | 9/2017 | Thom ................... G06N 10/00 |
| 2017/0255709 | A1 * | 9/2017 | Cho .................... G06F 16/2272 |
| 2017/0255872 | A1 * | 9/2017 | Hamze ..................... G06F 9/02 |
| 2018/0285685 | A1 * | 10/2018 | Singh ................... G06F 17/153 |
| 2018/0285693 | A1 * | 10/2018 | Kafai ................... G06F 17/147 |
| 2019/0079968 | A1 * | 3/2019 | Griffith ............... G06F 16/9024 |

OTHER PUBLICATIONS

Fadaei, S. "Mechanism Design via Dantzig-Wolfe Decomposition," arXiv preprint, 2015, arXiv:1508.04250.

Wang, B. "Sparse coding on D-Wave hardware," NextBigFuture, Apr. 29, 2013, 8 pages, Retrieved from the internet <URL: https://www.nextbigfuture.com/2013/04/sparse-coding-on-ct-wave-hardware.html>.

PCT International Search Report and Written Opinion, PCT Application No. PCT/US2015/020033, dated May 7, 2018, 18 pages.

Gunnerud et al., "Dantzig-Wolfe Decomposition for Real-Time Optimization—Applied to the Troll West Oil Rim," IFAC Proceedings, 2009, pp. 69-75, vol. 42, Issue 11, May be Retrieved at<URL: http://pdfs.semanticscholar.org/d8d0/d74939b16ab798525ae0772d6f1186556542.pdf>.

George F. Viamontes et al., Gate-Level Simulation of Quantum Circuits, University of MI, Ann Arbor, MI, IEEE, EECS, Conference Date Jan. 24, 2003.†

Dylan Griffith, Tensor Networks and the Ising Model, Oct. 26, 2012, University of Sydney, South Wales, Australia.†

Danai Koutra et al., Algorithms for Graph Similarity and Subgraph Matching, Published Dec 4, 2011.†

\* cited by examiner
† cited by third party

USING CACHING TECHNIQUES TO IMPROVE GRAPH EMBEDDING PERFORMANCE

CROSS-REFERENCE TO RELATED APPLICATION(S)

This application claims priority under 35 U.S.C. § 119(e) to U.S. Provisional Patent Application Ser. No. 62/535,854, "Using Caching Techniques to Increase Embedding Performance," filed Jul. 22, 2017. This application is also a continuation-in-part of U.S. patent application Ser. No. 15/446,973, "Quantum Computing as a Service," filed Mar. 1, 2017. The subject matter of all of the foregoing is incorporated herein by reference in their entirety.

BACKGROUND

1. Technical Field

The present invention relates to graph embedding, for example as used in the field of quantum computing to generate embeddings for problems to be solved on physical quantum hardware.

2. Description of Related Art

Quantum processing devices exploit the laws of quantum mechanics in order to perform computations. Quantum processing devices commonly use so-called qubits, or quantum bits, rather than the bits used in classical computers. Classical bits always have a value of either 0 or 1. Roughly speaking, qubits have a non-zero probability of existing in a superposition, or linear combination, of 0 and 1. Certain operations using qubits and control systems for computing using qubits are further described in U.S. patent application Ser. No. 09/872,495, "Quantum Processing System and Method for a Superconducting Phase Qubit," which is hereby incorporated by reference in its entirety.

In the field of quantum computing, given a problem that is to be solved by a physical quantum processing device, the problem is first "embedded" onto the physical quantum hardware. For example, if a problem is to be solved using a D-Wave quantum processing device, "embedding" will map the problem onto the chimera graph architecture of that device.

The "embedding" process is subject to the characteristics of the particular quantum device used. This can make the embedding process computationally difficult. For example, the quantum hardware that currently exists does not exhibit full connectivity between all qubits, instead only providing physical connections between nearby qubits. As a result, since not every qubit is connected to every other qubit, this limits the mappings of logical variables from the problem formulation onto qubits of the quantum hardware. Logical variables that are related to each other preferably are mapped onto qubits that are physically coupled to each other.

This can be represented mathematically as follows. Given a graph of the couplings between physical qubits (e.g., a chimera graph on current hardware) and a graph representing the problem to be solved, find a subgraph of the chimera graph that is isomorphic to the problem graph. This is known to be a computationally difficult problem. However, the embedding process must also take into account the fact that there may not exist such a subgraph. Therefore, the embedding process also usually incorporates "chaining" multiple physical qubits to represent one logical variable in the problem.

Because this process is highly computationally intensive, heuristic methods are often used. For a given problem and given hardware, there may be a large number of potential embeddings. Furthermore, failure to find an embedding does not prove that no such embedding exists.

Because the motivation for using quantum processors to solve problems is the desire to find a solution quickly, it is problematic if the process of generating an embedding to map the problem onto the quantum hardware takes too long.

SUMMARY

The present disclosure describes approaches to speed up the embedding process for quantum computation through the use of caching and related techniques. The embedding process is computationally intensive and is often the slowest part of solving a problem on a quantum computer. However, problems with the same graph structure can use the same embedding. If an embedding has been successfully generated for one problem, and then one is presented with a new problem that is structurally equivalent, one need not create a new embedding. Instead, the old embedding can be used to embed the new problem.

In one aspect, a data structure stores problems and their corresponding embeddings. When computing future embeddings, this data structure can be queried to determine whether an embedding has already been computed for a problem with the same structure. If it has, the embedding can be retrieved from the data structure, saving the time and computational expense of generating a new embedding.

The query is not required to be based on exact matches. If a new problem is similar in structure to a previous problem(s), those embedding(s) may be used to accelerate the generation of an embedding for the new problem, even if they cannot be used directly to embed the new problem.

Other aspects include components, devices, systems, improvements, methods, processes, applications, computer readable mediums, and other technologies related to any of the above, including use of these techniques for applications other than quantum computing.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
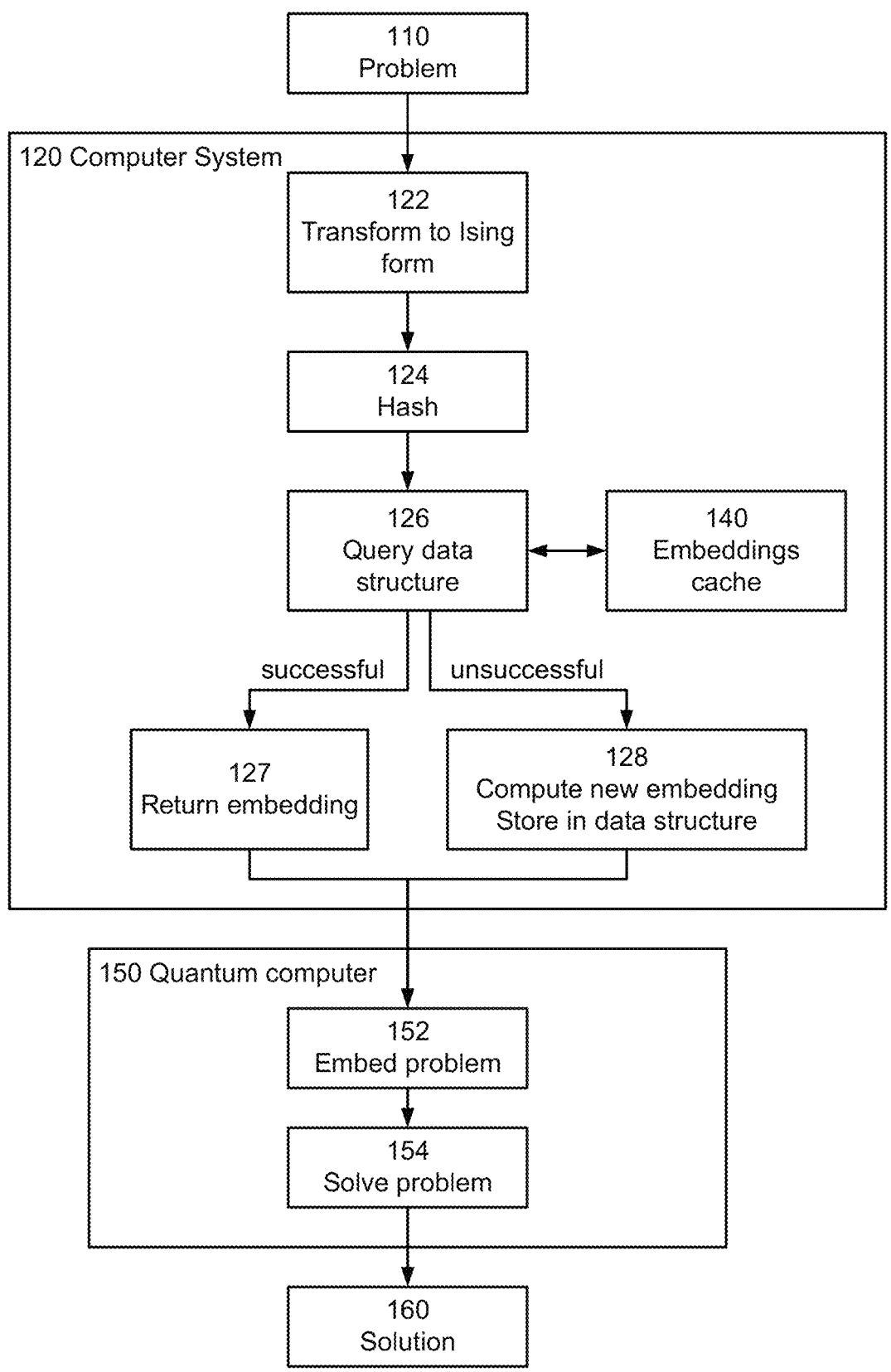
FIG. 1 is a flow chart diagram for caching embeddings for a quantum processing device based on exact matches.

FIG. 1 is a flow chart diagram for caching embeddings for a quantum processing device based on exact matches. The problem of interest 110 is a problem that a user desires a solution for. It will be solved by a quantum processing device. The user may specify that the problem should be solved by a quantum computer, or a computer system may determine the problem is suitable for solution by a quantum computer. For convenience, the problem of interest will be referred to as the current problem 110.

The current problem 110 is loaded onto a digital computer system 120. The computer system transforms 122 the current problem into the Ising form:

$$G = -\sum_i h_i s_i - \sum_{i<j} J_{i,j} s_i s_j \qquad (1)$$

where G is the objective function, $h_i$ are the flux biases on each qubit $s_i$, and $J_{i,j}$ are the couplings between qubits $s_i$ and $s_j$. Current quantum processing devices, including quantum annealing computers, solve problems with this structure.

In this example, the digital computer generates 124 a hash of the Ising form notation of the Ising matrix composed of the elements $J_{i,j}$ and $h_i$. Examples of hash functions include the MD5 algorithm. This hashing 124 associates a unique combination of letters and numbers to a specific Ising matrix. The use of an MD5 or other type of hash is one possible implementation, but other implementations will be apparent.

Once the hash is computed 124, the digital computer queries 126 a data structure 140 that contains known pairs of problems and their corresponding embeddings. The data structure effectively functions as a cache of known embeddings and, for convenience, it may be referred to as an embeddings cache. The problem/embedding pairs in the data structure are indexed by indices based on the Ising matrices for the problems. In this example, the index is the hash 124 of the Ising form notation of the Ising matrix. The embedding part of each pair is typically represented by an encoded or compressed version rather than the actual embedding. Pointers may also be used in the data structure.

In FIG. 1, the query 126 returns only exact matches. That is, the query is successful and returns an embedding only if the hash for the current problem exactly matches one of the existing hashes in the data structure 140. If this hash already exists as an index in the data structure (branch 127), this means the current problem has the same graph structure as a previous problem for which the embedding has already been computed. The previously computed embedding is returned 127 and used as the embedding for the current problem. This avoids the computationally expensive task of calculating a new embedding.

However, if the query is not successful (i.e. the hash does not exist as an index in the data structure—branch 128), the digital computer 120 creates 128 a new embedding for the current problem. There are a variety of algorithms used to calculate embeddings. Many are structured as a decision problem, returning one of many possible embeddings. However, not all embeddings are of equal quality so often there is also some sort of optimization. One example of an embedding algorithm is Choi's TRIAD algorithm. The hash of the current problem and the corresponding new embedding is also added to the data structure 140 as an additional problem/embedding pair.

Once an embedding is obtained, either by retrieving 127 a previously computed embedding or by creating 128 a new embedding, the problem of interest 110 is embedded 152 onto the quantum computer 150. The quantum processing device 150 then solves 154 the problem. The information from the digital computer 120 is sent to the quantum computer 150, which may be either local or remote to the digital computer and to the user. The solution 160 from the quantum computer 150 is returned to the user.

Rather than restricting queries for exact matches as was the case in the above example, the data structure could be queried for previous problems that have a similar (but not necessarily same) graph structure as the current problem. The system could then proceed to compute an embedding for the current problem, but using the similar problems to accelerate the computation. For example, the embedding for the similar problem could be used to seed the initial state of an embedding algorithm, producing a viable embedding for the current problem more quickly than if the embedding algorithm started from a random state.

Figure 2:
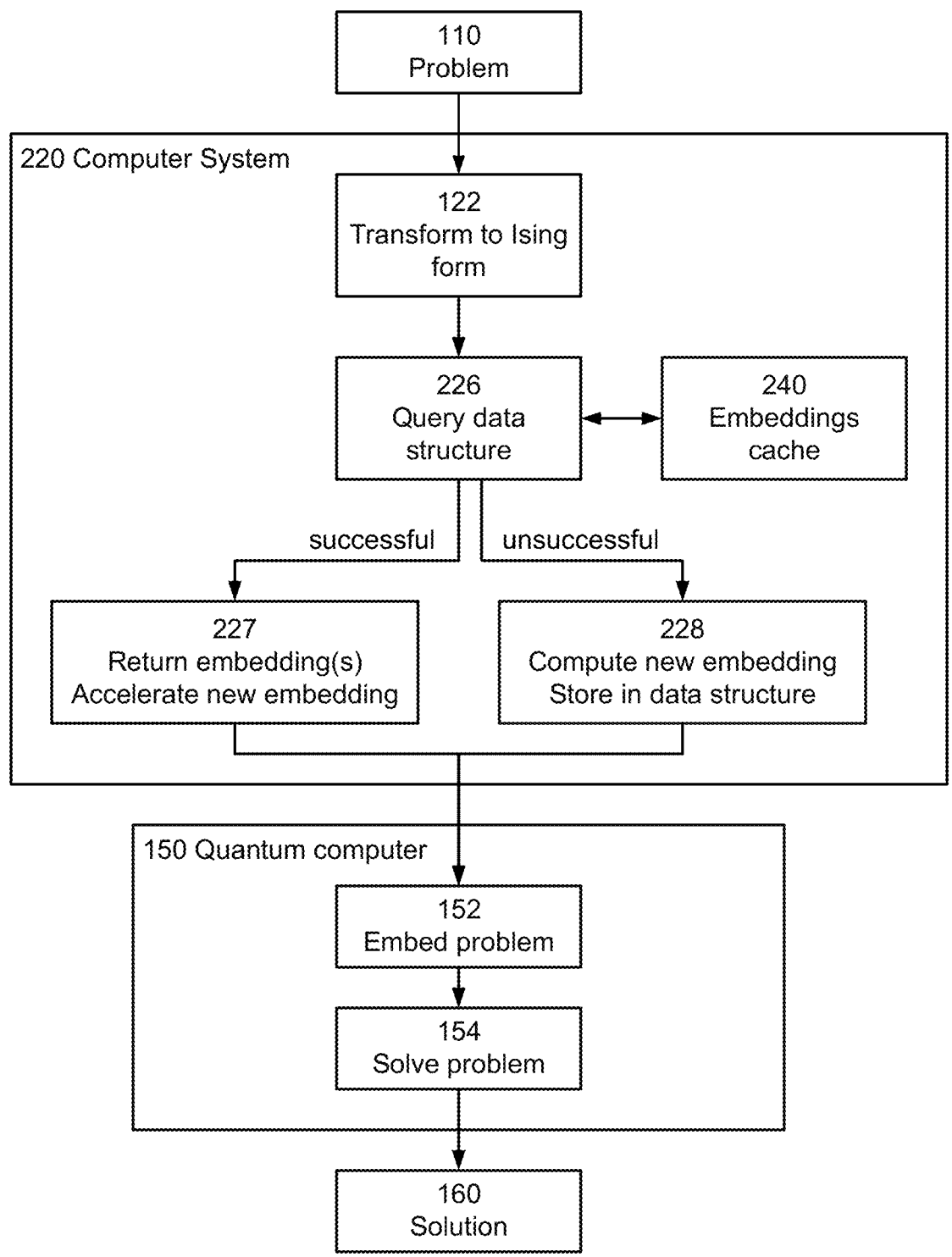
FIG. 2 is a flow chart diagram for caching embeddings for a quantum processing device based on similar graph structures.

FIG. 2 is a flow chart diagram for caching embeddings for a quantum processing device based on similar graph structures. As in FIG. 1, the current problem 110 is received by a computer system 220, which transforms 122 the current problem into the Ising form. However, instead of using a hash to query the data structure 240 for an exact match, the data structure 240 is queried 226 to find a previously solved problem(s) with similar graph structure to the current problem. The query 226 could return multiple similar embeddings.

The graph structure of a problem may be defined by the Ising matrix for the problem or by a graph representing the problem. The similarity of two problems may then be measured based on the similarity of their Ising matrices or on the similarity of their graphs. Different measures may be used. For example, the query may return embeddings based on the smallest graph edit distance. Graph edit distance is the number of basic operations required to transform one graph into another. Examples of basic operations are vertex insertion, vertex deletion, edge insertion, and edge deletion. Different sets of basic operations may be used to define different graph edit distances. The query may return the problem/embedding pair(s) that have the smallest graph edit distances to the current problem, or the problem/embedding pairs that are within a threshold graph edit distance to the current problem.

Another possible measure is based on largest common subgraph. The largest common subgraph between graphs A and B is the largest subgraph within graph A that is isomorphic to a subgraph within graph B. It can be measured as an induced subgraph where the largest number of common vertices in the subgraph is the largest, or an edge subgraph where the largest number of shared edges in the subgraphs is the selection criteria. The query may return problem/embedding pair(s) that have the largest common subgraph(s) with the current problem, or the problem/embedding pairs that have common subgraph(s) with the current problem that are above a threshold.

The index to the data structure 240 will depend on the definitions of the problem structure and the similarity measure used. Different methods of graph database search can be used for the data structure 240. For example, subgraph hashing may be used. A simple approach would be to search the database first by number of nodes. So if we have a problem graph A, we would calculate or estimate the graph edit distance or largest common subgraph for the graphs with the most similar sizes. In addition, some problem/embedding pairs may be filtered out using known techniques based on other factors that indicate they are not close to the problem of interest.

If the query is successful 227, the previously computed embedding(s) for similar problems are returned. If the query was not an exact match, then the returned embeddings cannot be used to embed the current problem. However, they may be used to accelerate 227 the computationally expensive task of creating a new embedding.

In one approach, the computer system uses a genetic algorithm to evolve a population of embeddings to generate a suitable embedding for the current problem. To accelerate this process, the embedding(s) for similar problems returned by the query are at some point included in the population evolved by the genetic algorithm or otherwise used to generate the population evolved by the genetic algorithm. The genetic algorithm is just one of many methods for computing an embedding and is used here as an example. More generally, the embedding algorithm makes use of the known embedding(s) for similar problems to accelerate the search for a viable embedding for the current problem.

If the query is not successful (i.e. does not return any values—branch 228), the computer system 220 creates 228 a new embedding for the current problem. The index for the current problem and the corresponding new embedding is also added to the data structure 240 as an additional problem/embedding pair.

As in FIG. 1, the problem and embedding are then passed to a quantum computer 150, which finds a solution 160 that is returned to the user.

The approaches described above are especially amenable to a cloud quantum computing system, where quantum computing is provided as a shared service to separate users. One example is described in patent application Ser. No. 15/446,973, "Quantum Computing as a Service," which is incorporated herein by reference. One advantage of this approach is that the data structure may be built up more quickly, as problem/embedding pairs are collected from previous problems run by multiple different, unrelated users accessing the shared service.

Figure 3:
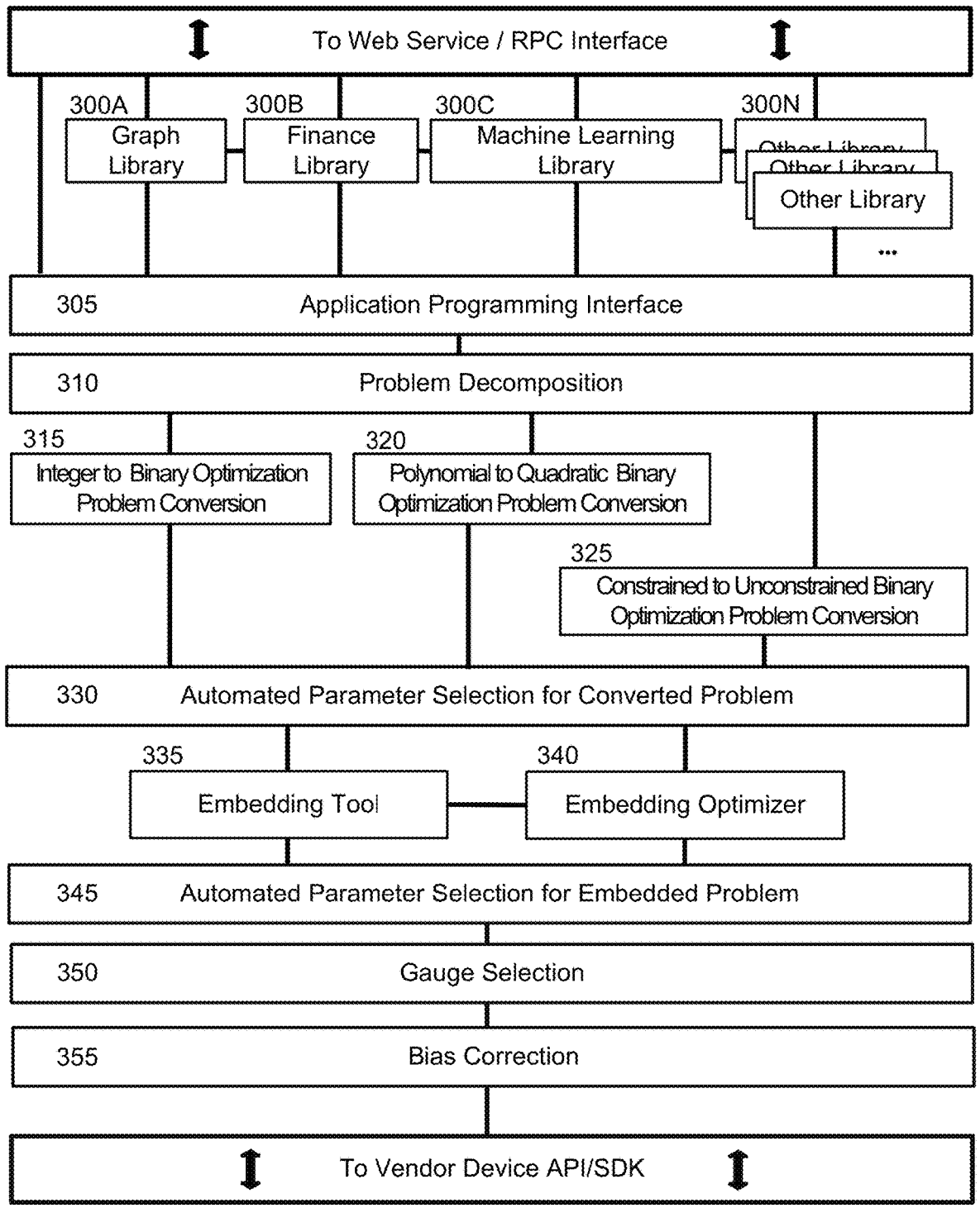
FIG. 3 is a logical diagram of a backend server suitable for use in providing quantum computing as a service (QCaaS).

FIG. 3 is a logical diagram of a backend server suitable for use in providing quantum computing as a service (QCaaS). Data flows into and out of the server via the interfaces at the top and bottom of the diagram. The web service/RPC interface at the top of FIG. 3 is user-facing. The vendor device API/SDK at the bottom connects to the hardware quantum processing device(s).

The backend server may contain one or more domain-specific libraries 300 that may be useful for developing software for or solving problems on quantum processing devices. Each domain-specific library may include software routines, data models, and other such resources as may typically appear in a software library. FIG. 3 specifically shows graph analytics 300A, finance 300B, and machine learning 300C as domains where domain-specific libraries and routines may be especially useful, but library 300N emphasizes that any domain-specific library may be incorporated at this layer of the backend server. The numbering 300A-N emphasizes the extensible nature of the backend server. Based upon the components lower down in the diagram, any number of domain-specific libraries 300 may be written and integrated into the backend server.

The API 305 exposes the functions, data structures, models, and other core interfaces of the backend server. The API 305 may connect with one or more libraries 300A-N and/or may directly communicate with the web service/RPC interface, depending on the information being supplied to the backend server. The API 305 is responsible for examining a problem and whatever information is supplied to the backend server and determining how to execute the problem on quantum processing devices and/or classical solver libraries, with the help of the remaining modules shown in FIG. 3.

One such module is problem decomposition module 310. The processes conducted by this module involve taking a large problem and splitting it into smaller subproblems, whose solutions may be combined to obtain an exact or approximate solution to the entire problem. For example, if one is solving the Traveling Salesman Problem (TSP) for a large number of cities, there are heuristics in the literature for how to decompose the problem into multiple smaller TSP subproblems over smaller numbers of cities, and to then recombine the solutions of those subproblems into an approximate solution for the overall TSP problem.

The modules, 315, 320, and 325, relate to taking a discrete optimization problem of one form and converting it into a quadratic binary unconstrained form. Module 315 uses heuristics to convert an integer optimization problem into a binary optimization problem. Module 320 uses heuristics to convert a higher-order polynomial binary optimization problem into a quadratic binary optimization problem. Module 325 uses heuristics involving penalty terms to convert a constrained binary optimization problem into an unconstrained binary optimization problem. Depending on the input provided to the backend server, none, one, some, or all of these modules 315, 320, 325 may be used in order to prepare the problem for solution on the quantum processing devices and/or other solver libraries underlying the platform.

Module 330 provides optimizations for the processed problem in order to improve the quality of the solution obtained via the platform.

When the problem is in an optimized state, embedding tools 335, 340 may be run to fit the problem onto a model of the particular hardware architecture of a target quantum processing device. For instance, if a problem is to be solved using a D-Wave quantum processing device, these tools will map the problem onto the chimera graph architecture of that device. The embedding tool 335 may be vendor-supplied or a third-party library, whereas tool 340 can take the output of another embedding tool 335 and provide additional optimizations to make the embedding as compact as possible.

Tool 340 may implement the functions described in FIGS. 1 and/or 2. Alternatively, tool 340 may operate by running the embedding tool 335 multiple times, and choosing the best result to use as the embedding (such may be the mode of operation when tool 335 produces different outputs for different executions). The "best" output of tool 335 may be the embedding with the fewest number of qubits used, the embedding with the shortest chain lengths, or some other criteria that may be specified. Other techniques may be incorporated into the platform for selecting and optimizing embeddings.

The embedded problem (output of tools 335 and/or 340) is then optimized for execution on a specific device via modules 345, 350, 355. At the very end of the process, the optimized problem is dispatched to one or more vendor device APIs/SDKs. At a later point in time, solutions are returned and are passed back to the end user.

In this system, a relatively large number of problems will be transmitted to the service provider for embedding and solving. In this case, the service provider could maintain a data store of embeddings, drawing on this data store to improve overall performance for users. However, the utility of an embedding caching system is not limited to a service provider. A cache could just as easily be implemented locally. Alternatively, all processing could be done locally, but a cloud-based cache could be consulted when searching for an embedding. These applications of embedding caching may vary in implementation.

Although the detailed description contains many specifics, these should not be construed as limiting the scope of the invention but merely as illustrating different examples. It should be appreciated that the scope of the disclosure includes other embodiments not discussed in detail above. For example, the data structure may be implemented in different ways, including using a multi-level data structure (e.g., cache and memory).

As another example, the techniques may be used for applications other than embedding problems to be solved by quantum computers. In a more general sense, the problem/embedding pairs are mappings from one type of graph (the one describing the problem) to another type of graph (the one describing the quantum hardware). Other applications utilize mappings between two types of graphs and, in those applications, the caching techniques described above may be used particularly if the mapping calculation requires significant resources. Applications may include chemical analysis, data analytics and social networking, for example.

Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

What is claimed is:

1. A method implemented on a computer system comprising a processor, the processor executing instructions to effect a method for caching embeddings for a quantum processing device, the method comprising:
   receiving a current problem to be solved by the quantum processing device;
   querying a data structure containing problem/embedding pairs for a previous problem with a similar graph structure to the current problem, wherein the problem/embedding pairs include problem/embedding pairs that relate previous problems with their corresponding embeddings onto a graph of the quantum processing device, the graph of the quantum processing device indicating qubits and connections between the qubits, wherein the graph of the quantum processing device does not include full connectivity between all qubits;
   in response to the query being successful, receiving the embedding for the previous problem with the similar graph structure; and
   generating a current embedding for the current problem onto the graph of the quantum processing device based on the received embedding for the previous problem with the similar graph structure.

2. The computer-implemented method of claim 1 wherein the graph structures of the problems are defined by Ising matrices for the problems.

3. The computer-implemented method of claim 1 wherein the query is successful only if the previous problem has the same graph structure as the current problem, and the received embedding is used as the current embedding for the current problem.

4. The computer-implemented method of claim 1 wherein the query is successful if the previous problem has similar or same graph structure as the current problem.

5. The computer-implemented method of claim 4 wherein the query is successful only if the previous problem has a graph that is within a predefined graph edit distance from a graph of the current problem.

6. The computer-implemented method of claim 4 wherein the query is successful only if the largest common subgraph between the previous problem and the current problem is above a predefined threshold.

7. The computer-implemented method of claim 4 wherein the data structure is queried using subgraph hashing.

8. The computer-implemented method of claim 4 wherein generating the current embedding for the current problem comprises:
   using the received embedding as a starting point to generate the current embedding.

9. The computer-implemented method of claim 4 wherein generating the current embedding for the current problem comprises:
   using a genetic algorithm to generate the current embedding, wherein the received embedding is included in or used to generate a population evolved by the genetic algorithm.

10. The computer-implemented method of claim 4 wherein the successful query returns multiple embeddings for previous problems each with similar graph structure to the current problem.

11. The computer-implemented method of claim 1 wherein the problem/embedding pairs are indexed by indices based on the Ising matrices for the problems.

12. The computer-implemented method of claim 11 wherein the indices are hashes of an Ising form notation of the Ising matrices.

13. The computer-implemented method of claim 1 wherein the embeddings are encoded and/or compressed in the problem/embedding pairs.

14. The computer-implemented method of claim 1 further comprising:
generating the current embedding and adding the current problem and current embedding as an additional problem/embedding pair in the data structure.

15. The computer-implemented method of claim 1 wherein the data structure is a multi-level data structure.

16. The computer-implemented method of claim 1 further comprising:
embedding the current problem onto the graph of the quantum processing device using the current embedding.

17. The computer-implemented method of claim 1 wherein the quantum processing device is available to separate users as a shared service.

18. The computer-implemented method of claim 17 wherein the problem/embedding pairs are collected from previous problems run by multiple different, unrelated users accessing the shared service.

19. A non-transitory computer-readable storage medium storing executable computer program instructions to effect a method for caching embeddings for a quantum processing device, the instructions executable by a processor and causing the processor to perform a method comprising:
receiving a current problem to be solved by the quantum processing device;
querying a data structure containing problem/embedding pairs for a previous problem with a similar graph structure to the current problem, wherein the problem/embedding pairs include problem/embedding pairs that relate previous problems with their corresponding embeddings onto a graph of the quantum processing device, the graph of the quantum processing device indicating qubits and connections between the qubits, wherein the graph of the quantum processing device does not include full connectivity between all qubits; in response to the query being successful, receiving the embedding for the previous problem with the similar graph structure; and
generating a current embedding for the current problem onto the graph of the quantum processing device based on the received embedding for the previous problem with the similar graph structure.

20. A method implemented on a computer system comprising a processor, the processor executing instructions to effect a method for caching mappings from a first type of graphs to a second type of graphs, the method comprising:
receiving a current graph of the first type, the current graph corresponding to a problem to be solved by a quantum processing device;
querying a data structure containing first type/second type pairs for a previous first type graph with a similar graph structure to the current first type graph, wherein the first type/second type pairs include first type/second type pairs that relate previous first type graphs with their corresponding second type graphs, the second type graphs representing embeddings onto a graph of the quantum processing device, the graph of the quantum processing device indicating qubits and connections between the qubits, wherein the graph of the quantum processing device does not include full connectivity between all qubits;
in response to the query being successful, receiving the second type graph for the first type graph with the similar graph structure; and
generating a current second type graph for the current first type graph representing an embedding onto the graph of the quantum processing device, the current second type graph generated based on the received second type graph for the previous first type graph with the similar graph structure.

* * * * *